April 22, 1952 K. F. UMPLEBY 2,593,633

ELECTRODYNAMIC PHONOGRAPH PICKUP

Filed April 12, 1948

INVENTOR.
KENNETH F. UMPLEBY
BY Walter P. Huntley
ATTORNEY

Patented Apr. 22, 1952 2,593,633

UNITED STATES PATENT OFFICE 2,593,633

ELECTRODYNAMIC PHONOGRAPH PICKUP

Kenneth F. Umpleby, Baltimore, Md., assignor to The Decca Record Company, Limited, London, England, a corporation of Great Britain Application April 12, 1948, Serial No. 20,473
In Great Britain April 29, 1947

5 Claims. (Cl. 179—100.41)

This invention relates to electric phonograph pick-ups, and has particular reference to a pick-up of the moving coil type which finds particular utility when employed on automatic record-changing phonographs.

In the use of electric pick-ups on automatic record changing phonographs which are subject to many and frequent repeated operations, as for example, automatic phonographs of the coin operated variety, considerable difficulty is encountered in excessive wear of the records and corresponding wear of the reproducing stylus. Also, the pick-up itself is often damaged by the repeated impacts and jars consequent upon the operation of the automatic record-changing apparatus and the dropping of the pick-up onto the record at the beginning of the play of each record.

Heretofore, the attempts to solve this problem have revolved about attempts to develop harder and longer wearing stylus material, and the development of light weight pick-up assemblies and counterweighting measures designed to reduce the pressure on the record exerted by the stylus. These attempts have not been entirely successful because it has heretofore been impossible to reduce the actual weight of the pick-up to the low value required to obtain the desired results. Counter-balancing does not solve the problem because the mass of the pick-up and its counterbalance produce great stresses at the time the pick-up is dropped onto the record. Also if the weight of the pick-up is counterbalanced to the degree necessary to substantially eliminate record wear, the device will not operate satisfactorily on the considerable number of slightly warped records which are usually encountered.

It is therefore an object of this invention to provide an electric phonograph pick-up which overcomes the above noted disadvantages by reason of the light weight and low inertia of the mass which is carried on the reproducing stylus.

It is also an object of this invention to provide a pick-up of the character described in the preceding paragraph in which those parts that are not required to move in accordance with the undulations of the record groove are supported from the record independently of the reproducing stylus.

It is a still further object of this invention to provide a pick-up of the character set forth in the preceding paragraph in which the moving parts are secured to the remainder of the parts in such a way as to move freely in a vertical direction but be restrained against movement in other directions.

It is another object of this invention to provide an electric phonograph pick-up of the moving coil type in which the reproducing stylus and the moving coil are supported for substantially free vertical movement relative to the permanent magnet, and in which the weight of the permanent magnet is borne directly by the record independently of the reproducing stylus.

Other objects and advantages of this invention will be apparent from a study of the following specification read in connection with the accompanying drawings, wherein.

Figure 1:
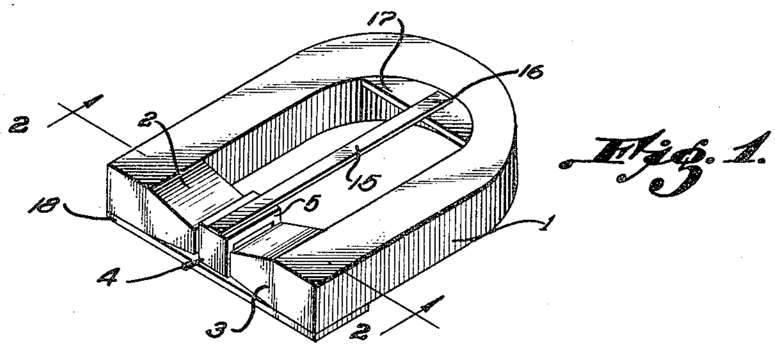
Figs. 1 is a perspective view of the pick-up assembly.

Referring to the drawings, the preferred embodiment of this invention is illustrated as comprising an electric phonograph pick-up of the moving coil type. The pick-up assembly comprises a permanent magnet 1 of generally horse shoe shape including pole pieces 2 and 3 defining an air gap within which is positioned a moving coil assembly indicated generally by the reference character 4.

Figure 2:
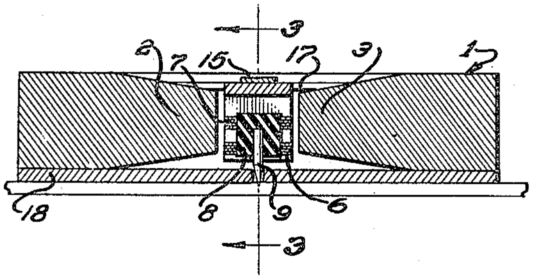
Fig. 2 is a cross sectional view taken substantially along the line II—II of Fig. 1.
Figure 3:
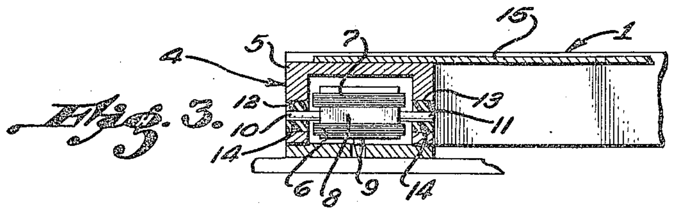
Fig. 3 is a fragmentary sectional view taken substantially along the line III—III of Fig. 2.

As is best shown in Fig. 3, the moving coil assembly 4 comprises a carrier 5 of a rectangular U-shape defining between the arms of the U-shape a space within which the moving coil is mounted. The moving coil is wound as two spaced coils 6 and 7 which are disposed coaxially upon a bobbin 8. A reproducing stylus 9 projects from the under side of the bobbin 8, being retained suitably as by means of coacting tapers in a suitable socket in the bobbin 8 as shown in Fig. 2.

Projecting laterally from opposite sides of the bobbin 8 from between the coils 6 and 7 are two trunnion pins 10 and 11 which are received in apertures 12 and 13 provided in the leg portions of the carrier 5. The apertures 12 and 13 are made large with respect to the diameters of the pins 10 and 11, and the annular spaces between the pins and the walls of the corresponding apertures are filled with a resilient material 14 such as rubber or the like. The resilient material 14 is preferably bonded to the carrier 5 and also to the pins 10 and 11. The parts are so positioned that the stylus 9 projects downwardly from the bobbin 8, and the axis of the trunnion pins 10 and 11 is tangential to the record grooves. This serves to mount the bobbin 8 and coils 6 and 7 carried thereby for limited oscillatory movement sufficient to allow the stylus 9 to follow the undulations of the record groove without requiring any lateral oscillation of the carrier itself.

The moving coil assembly 4, and specifically the carrier 5, is fitted closely within the space between the parallel faces of the pole pieces 2 and 3 so that lateral movement of the moving coil assembly 4 is prevented, while allowing the assembly to move in a vertical direction toward and away from the record. Fore and aft movement (in the direction of the length of the record groove) is prevented by the use of a spring support 15, one end of which is suitably attached to the upper surface of the carrier 5, and the other end of which is suitably secured as shown at 16 to a bracket 17 formed integrally with or secured to the toe portion of the horse shoe magnet 1. The spring support is made very thin in the vertical dimension and as wide as possible in the lateral direction to hold the moving coil assembly 4 against fore and aft movement while permitting substantially free vertical movement relative to the magnet 1.

The bobbin 8, pins 10 and 11, and the carrier 5 are all made of non-magnetic material, and since the moving coil assembly 4 should be as light in weight as possible, these parts are preferably made of a light weight, non-metallic insulating material. If desired the carrier 5 and pins 10 and 11 may be made of a light weight non-magnetic metal such as a suitable alloy of aluminum.

A pad 18 of felt or similar material is secured to the underside of the magnet 1 and is provided with a suitable opening through which the reproducing stylus 9 projects. The pad 18 is intended to bear on the surface of the record being reproduced to support independently of the stylus 9 the weight of the magnet 1 and the tone arm to which it is normally attached. The weight supported on the pad 18 is sufficient to force a part of the easily deformable material of which it is made into the grooves in the record to thereby drive the pick-up assembly inwardly toward the center of the record as the same is rotated to keep the proper alignment between the stylus 9 and the record groove with which it is engaged. At the same time, the pad 18 effects a wiping of the record surface to remove any dust particles and thus contributes to an improvement in the quality of the reproduction as well as reducing the wear on the record and stylus.

By keeping the weight of the moving coil assembly 4 to a minimum and making the spring 15 very flexible, the stylus pressure on the record surface can be made much less than is possible where the mass of the entire assembly is carried by the stylus. Similarly, the impacts resulting from the placing of the stylus into contact with the record at the beginning of each record played are minimized by the light weight of the moving coil assembly 4 and the flexibility of the spring 15. Despite the vertical compliance of the system, the moving coil assembly 4 is held against fore and aft movement by the spring 15 and is held against lateral movement by the close fit of the carrier 5 between the faces of the pole pieces 2 and 3.

From the foregoing it will be seen that the electric pick-up of this invention overcomes many of the disadvantages of the prior constructions and is particularly suited to use with automatic record changing mechanisms. Attention is directed particularly to the feature of making the moving parts as a separate sub-assembly which is loosely attached to the non-moving parts so as to reduce to a minimum the weight and inertia which is borne by the engagement of the stylus with the record.

While the preferred embodiment of this invention has been described, the same is not to be limited to the details of construction illustrated, except as defined in the appended claims.

I claim:

1. In an electric phonograph pick-up for producing electrical signals corresponding to laterally cut undulations of a spiral groove in a disc record, the combination of: a fixed part; a stylus for engaging said record groove and following the undulations thereof; a moving part attached to said stylus for movement therewith; means on said moving part responsive to a given relative motion between said moving part and said fixed part for producing an electrical signal corresponding to said given relative motion; another part supporting said moving part for movement by said stylus in correspondence with said undulations; and mounting means mounting said other part, said moving part and said means thereon, and said stylus as a sub-assembly on said fixed part for substantially free movement of said sub-assembly toward and away from said record and for holding said sub-assembly against movement parallel to the surface of said record.

2. In an electric phonograph pick-up for producing electrical signals corresponding to undulations of a record groove, the combination of: a stylus for engaging said record groove and following the undulations thereof; a moving part attached to said stylus for movement therewith; a carrier for supporting said moving part and said stylus for movement relative to said carrier in accordance with said undulations; a fixed part; a thin flat spring interconnecting said carrier and said fixed part, said spring having its length disposed parallel to the surface of said record and parallel to a tangent to said record groove at the point of engagement of said stylus therewith, the smallest dimension of said spring extending substantially perpendicularly to the surface of said record, whereby said carrier is supported by said spring for substantially free movement relative to said fixed part toward and away from said record while being held against movement parallel to the surface of said record and lengthwise of said record groove; means coacting with said carrier and said fixed part for restraining said carrier against movement parallel to the surface of said record and transversely of said record groove; and means on said fixed part engaging said record for supporting the weight of said fixed part independently of said stylus.

3. In an electric phonograph pick-up for producing electrical signals corresponding to undulations of a record groove, the combination of: a stylus for engaging said record groove and following the undulations thereof; a coil attached to said stylus; a carrier; means mounting said coil and said stylus on said carrier for oscillatory pivotal movement relative thereto in response to movement imparted to said stylus by said undulations; a permanent magnet defining spaced parallel pole faces, said carrier being disposed between said pole faces and freely slidable therebetween toward and away from said record; a thin flat spring interconnecting said carrier and said magnet, said spring having its length disposed parallel to the surface of said record and parallel to a tangent to said record groove at the point of engagement of said stylus therewith, the smallest dimension of said spring extending substantially perpendicularly to the surface of said record, whereby said carrier is supported by said spring for substantially free movement relative to said magnet toward and away from said record while being held against movement parallel to the surface of said record and lengthwise of said record groove; and a pad of soft material secured to the underside of said magnet for engaging the surface of said record to support said magnet on said record independently of said stylus.

4. An electric pick-up for sound reproducing apparatus comprising a main body having a pad of soft material secured to the underside thereof for sliding on the surface of a disc record to thereby maintain a fixed distance between said main body and said record, said pad also acting as a means to move said main body radially when engaging a rotating record disc having a spiral groove therein; a transducer including a stylus holder and a fixed part and means responsive to a given relative motion between said part and said holder for producing an electrical signal corresponding to said given motion, said stylus holder being of substantially lower mass than said main body; means securing said fixed part immovably on said main body; a stylus secured by said holder for engaging said groove; carrier means cooperating with said stylus holder and mounting said stylus for free movement relative to said carrier means in a direction at right angles to the length of the record groove and restrained against movement in other directions; and mounting means connecting said carrier means to said main body for free movement toward and away from said record and for restraining movement of said carrier means in all other directions, said given relative motion being independent of said movement toward and away from said record.

5. In an electric phonograph pick-up for producing electrical signals corresponding to laterally cut undulations of a spiral groove in a disc record, the combination of: a transducer including a moving part and a fixed part and means responsive to a given relative motion of said parts for producing an electrical signal corresponding to said given motion; a stylus for engaging said record groove and following the undulations thereof; means connecting said moving part to said stylus for movement therewith; another part; means supporting said moving part and said stylus on said other part for movement relative thereto as said stylus follows the undulations of said groove; mounting means mounting said other part, said stylus, and said moving part as a sub-assembly on said fixed part for substantially free movement of said sub-assembly toward and away from said record and for holding said sub-assembly against movement parallel to the surface of said record, said given relative motion being independent of said movement toward and away from said record; and a pad of readily deformable material on the underside of said fixed part engaging said record for supporting the weight of said fixed part independently of said stylus, whereby said material is deformed into said groove to move said fixed part radially of said record as said record is rotated.

KENNETH F. UMPLEBY.

REFERENCES CITED

The following references are of record in the file of this patent:

UNITED STATES PATENTS

| Number | Name | Date |
|---|---|---|
| 1,767,610 | O'Leary | June 24, 1930 |
| 1,959,423 | Harrison | May 22, 1934 |
| 2,314,345 | Cortella | Mar. 23, 1943 |
| 2,330,801 | Abbott | Oct. 5, 1943 |
| 2,388,578 | Sinnett et al. | Nov. 6, 1945 |
| 2,416,082 | Balmer | Feb. 18, 1947 |
| 2,430,476 | McClain | Nov. 11, 1947 |
| 2,485,137 | Brown et al. | Oct. 18, 1949 |

FOREIGN PATENTS

| Number | Country | Date |
|---|---|---|
| 512,766 | Great Britain | Nov. 30, 1937 |